United States Patent
Ruhl et al.

(12) 
(10) Patent No.: US 8,870,052 B2
(45) Date of Patent: Oct. 28, 2014

(54) METHOD AND ARRANGEMENT FOR WELDING ELECTRICAL CONDUCTORS

(75) Inventors: Sebastian Ruhl, Wetter (DE); Heiko Strobel, Munzenberg (DE); Sinan Koc, Mucke (DE); Peter Wagner, Wettenberg (DE); Dieter Stroh, Wettenberg (DE)

(73) Assignee: Schunk Sonosystems GmbH, Wettenberg (DE)

( * ) Notice: Subject to any disclaimer, the term of this patent is extended or adjusted under 35 U.S.C. 154(b) by 0 days.

(21) Appl. No.: 13/817,584

(22) PCT Filed: Aug. 17, 2011

(86) PCT No.: PCT/EP2011/064142
§ 371 (c)(1),
(2), (4) Date: Feb. 19, 2013

(87) PCT Pub. No.: WO2012/022763
PCT Pub. Date: Feb. 23, 2012

(65) Prior Publication Data
US 2013/0146644 A1    Jun. 13, 2013

(30) Foreign Application Priority Data

Aug. 18, 2010 (DE) .......................... 10 2010 037 031
Nov. 24, 2010 (DE) .......................... 10 2010 060 767

(51) Int. Cl.
*B23K 1/06* (2006.01)
*B23K 20/10* (2006.01)
*H01R 43/02* (2006.01)
*B23K 20/26* (2006.01)

(52) U.S. Cl.
CPC ................. *B23K 20/26* (2013.01); *B23K 20/10* (2013.01); *H01R 43/0207* (2013.01)

USPC ........ 228/110.1; 228/1.1; 228/4.5; 228/180.5

(58) Field of Classification Search
None
See application file for complete search history.

(56) References Cited

U.S. PATENT DOCUMENTS 3,821,048 A  *  6/1974  Acker et al. ................. 156/73.4
4,010,915 A     3/1977  Strutz et al.
(Continued)

FOREIGN PATENT DOCUMENTS

CH     378203 A     5/1964
DE     1499005 A1   6/1971
(Continued)

OTHER PUBLICATIONS

International Search Report dated Feb. 16, 2012, corresponding with International Application No. PCT/EP2011/064142.

*Primary Examiner* — Kiley Stoner
(74) *Attorney, Agent, or Firm* — Ladas & Parry LLP

(57) ABSTRACT

A method and apparatus for welding lines having metallic braids or strands to form an end node or transit node by introducing a first portion of each line into a compression space of an ultrasonic welding apparatus, wherein the first portions run along a straight line, wherein at least one line has a component at a distance from the end node or transit node to be welded, and at least the line which has the component is attenuated between the compression space and the contact element in a second portion by a change in profile of the line which is imposed using a deflection device. To this end, the line which has the component is oriented in extension of the straight line.

23 Claims, 8 Drawing Sheets

(56) References Cited

U.S. PATENT DOCUMENTS

Figure 1:
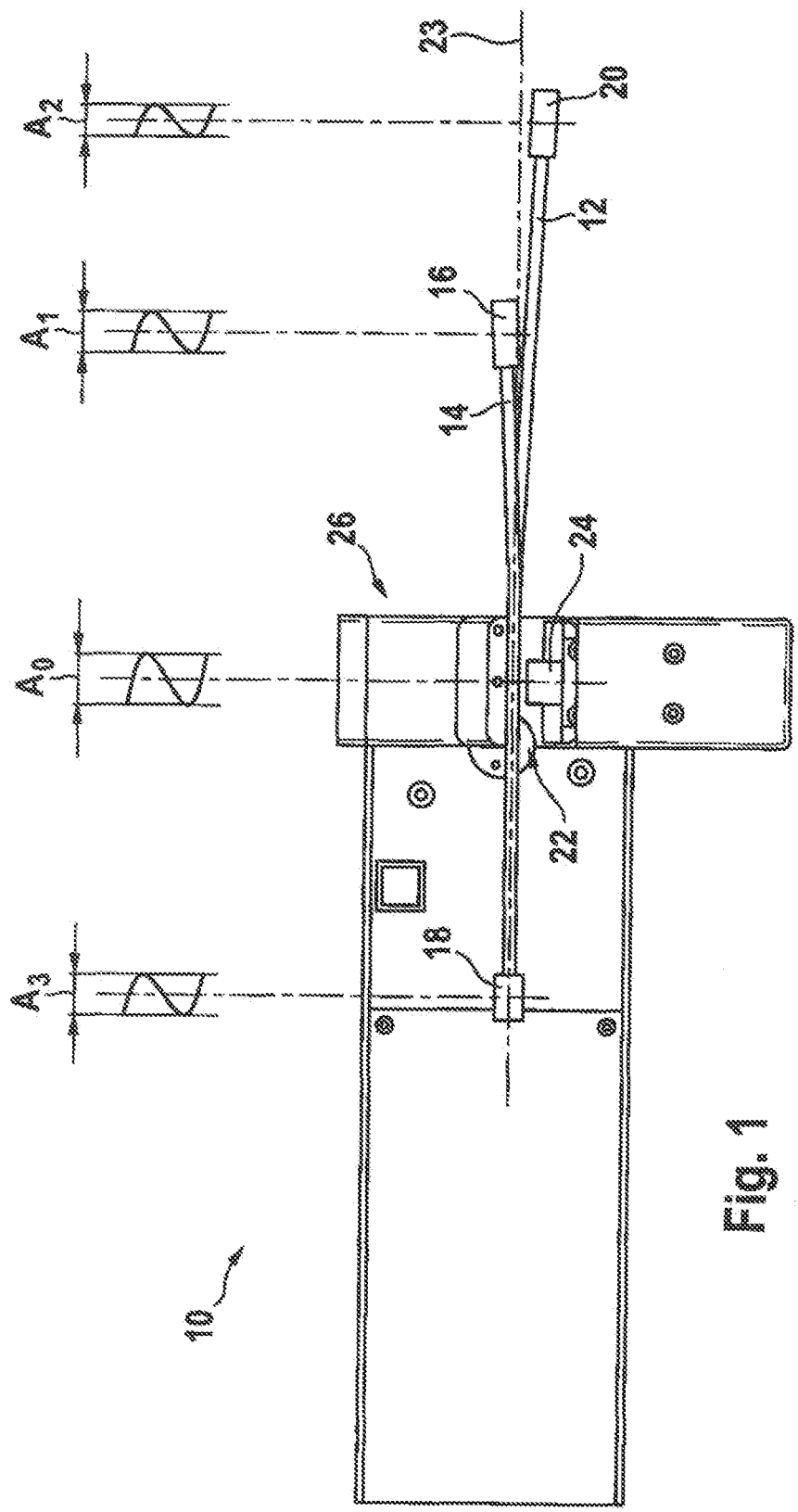

| | | | |
|---|---|---|---|
| 4,119,448 A * | 10/1978 | Hermanson et al. | 156/73.4 |
| 4,170,103 A * | 10/1979 | Norris et al. | 57/293 |
| 4,227,959 A * | 10/1980 | Brown | 156/515 |
| 4,301,958 A * | 11/1981 | Hatakenaka et al. | 228/4.5 |
| 4,931,114 A * | 6/1990 | Sliva | 156/73.1 |
| 5,223,070 A * | 6/1993 | Tsubone | 156/353 |
| 5,591,298 A * | 1/1997 | Goodman et al. | 156/580.1 |
| 5,781,990 A * | 7/1998 | Seidler et al. | 29/825 |
| 5,796,065 A * | 8/1998 | Fujiyoshi et al. | 219/78.02 |
| 6,827,817 B2 * | 12/2004 | Bleckmann et al. | 156/73.1 |
| 7,188,414 B2 * | 3/2007 | Schilson et al. | 29/868 |
| 2002/0002021 A1 * | 1/2002 | May et al. | 442/381 |
| 2002/0189750 A1 * | 12/2002 | Bleckmann et al. | 156/176 |
| 2004/0182491 A1 * | 9/2004 | Bleckmann et al. | 156/73.3 |
| 2006/0139742 A1 * | 6/2006 | Frankel et al. | 359/341.4 |
| 2006/0208033 A1 * | 9/2006 | Welter | 228/110.1 |
| 2012/0298645 A1 * | 11/2012 | Kleespiess et al. | 219/137 R |
| 2013/0146644 A1 * | 6/2013 | Ruhl et al. | 228/110.1 |

FOREIGN PATENT DOCUMENTS

| | | |
|---|---|---|
| EP | 1236563 A1 | 9/2002 |
| JP | 04-048739 A * | 2/1992 |
| JP | 58-131026 A * | 8/1993 |
| JP | 2007-109494 A * | 4/2007 |
| JP | 2007-109495 A * | 4/2007 |
| WO | 2008148813 A2 | 12/2008 |
| WO | 2009101844 A1 | 8/2009 |

* cited by examiner

METHOD AND ARRANGEMENT FOR WELDING ELECTRICAL CONDUCTORS

This application is a 371 of PCT/EP2011/064142, filed on Aug. 17, 2011, which claims priority to German patent application number 10 2010 037 031.2, filed Aug. 18, 2010, and German patent application number 10 2010 060 767.3, filed Nov. 24, 2010, which are incorporated herein by reference.

The invention relates to a method for welding cables made from metal strands or cores to form an end node or transit node by introducing in each case a first section of each cable into a compression space of an ultrasound welding device in which the first sections extend along a straight line, wherein at least one cable comprises, spaced from the end node or transit node to be welded, a component, such as a contact element, and at least the cable comprising the component, between the compression space and the component in a second section, is damped by a change in the course of the cable, which is forced by means of a deflection device.

The invention further relates to an arrangement for ultrasound welding of cables made from metal strands or cores, comprising a compression space holding in each case a first section of each cable, along whose longitudinal axis the first sections can be aligned, as well as a deflection device which holds at least one of the cables, preferably all of the cables, and which is arranged with spacing from the compression space in the extension of the longitudinal axis.

If electrical cables of which at least one, often several, are provided at their end with components such as contact parts which can be have a high degree of filigree, then the oscillations that occur during welding with ultrasound are transmitted through the cables to the contact parts, resulting in a risk of damage or destruction. The contact parts can be, for example, plug contacts, plug connectors, jacks or socket parts.

To dampen the oscillation, and thus to protect the contact parts, it is known to press a damping element onto the cables. This can occur in the form of damping jaws that have to be adjusted with respect to the other. However, it has been found that the damping effect is not very effective.

A more effective oscillation damping is achieved if the cables are bent by 90° after the compression space. However, from the point of view of handling, such a measure is not advantageous, because the cables to be welded are often very long, so that, given the size of the workplace, it is not always possible to bend the cables by 90°. Here, it must also be taken into account that the conductors, during the welding of a transit node, can extend on the two sides of the compression space.

From WO1997/004941 A1, an arrangement for fixing the position of insulated conductor ends of electrical conductors is known, wherein the conductor ends are welded with ultrasound for establishing an electrical connection, and a holder frame is provided which is used for fixing the position of the conductors relative to each other, and which is provided with holder elements for securing the end areas of the electrical conductors that have the conductor ends to a first partial area of their peripheral sides, and which can be engaged with a holding part which secures the conductor on a second partial area of their peripheral sides, wherein the holder frame and the holding part are provided with a molded on plastic sheathing which does not cover the conductor ends, to ensure a definitive, locked, positional securing of the conductor ends.

From EP-A-1 236 563, a method for soldering conductors can be obtained, wherein the soldering material is softened by ultrasound. The conductors to be welded are held in a plastic housing through which at least one of the conductors passes.

To absorb slack when conveying an electrical conductor, WO-A-2009/101844 provides for the conductor to be guided around rollers. One of the rollers is here arranged in such a manner that it can be adjusted toward other rollers.

The present invention is based on the problem of further developing a method and an arrangement of the type mentioned at the start, in such a manner that an effective damping of the cables occurs, so that damage of components, such as contact parts, that originate from the cables is ruled out, without any need for an additional amount of space or for a space requirement that makes handling difficult. The goal is to be able to weld the cables in the usual manner using in principle the usual workplaces for welding to form end nodes or transit nodes, without requiring expensive handling.

To solve the problem it is proposed substantially, in terms of process, that at least the cable comprising the component is aligned in the extension of the straight line and that the deflection device acts on the second section on opposite sides of said section, as a result of which, due to adjustment of the deflection direction toward the second section, said section undergoes a change in course in sections. Preferably, the second section is given an arc-S- or Z-shape or meandering change in course. The deflection of the cables should be between 3 mm and 20 mm.

For this purpose, it is provided in particular that the second section is guided between several deflection elements, such as cylindrical or conical elements or mold parts which, in order to produce the change in course, are adjusted relative to each other transversely with respect to the longitudinal direction of the cable or cables, in particular perpendicularly to the straight line.

Preferably, all the additional cables extending along the cable comprising the component, run through, between the deflection elements forming a guide, and they undergo a preferably arc-shaped change in course. Changes in course that deviate from the arc shape are also covered by the term "arc-shaped," provided that the line is deflected as a result in its course from the straight line by the deflection device in such a manner that the desired damping can be achieved.

Here, the change in course is in principle provided only in the second section, so that the cables, one of which comprises the component, extend again along the straight line or substantially along the straight line before and after the deflection device. In order to ensure this, it is provided in particular that, on the side of the deflection device which is opposite relative to the compression space, that is on the side of the deflection device that faces away from the compression space, an additional guide element extends, against which the cables are applied, so that, in the case of the changes in course that occur as a result of the relative adjustment of the pressure elements with respect to each other, a deflection of the free ends of the cables cannot occur such that they deviate noticeably in their course from the straight line.

In order to adjust at least one deflection element toward another deflection element or two deflection elements, of which in each case one deflection element extends in the direction of the course of the cable before and after the adjustable deflection element, a movement occurs in a horizontally or vertically extending plane. Vertically extending plane here means that the deflection element is adjusted both perpendicularly to the extension of the longitudinal axis of the compression space and also vertically with respect to it—in the case of a horizontally extending longitudinal axis. This results in a highly compact structural unit.

To facilitate the insertion of the cables into the compression space in the case of a vertically adjustable deflection element, the adjustable deflection element, which extends relative to the cables above the latter or beneath the latter, is first removed from the introduction area of the cables, in order to be adjusted horizontally subsequently, after the insertion of the cables into the compression space, and thus be positioned above the cables. Then, the deflection element is lowered, in order to force, at least during the welding of the cables, a change in the course of the latter such that the cables undergo the desired damping. A first counter deflection element extends between the compression space and the vertically adjustable deflection element, in particular relative to the adjustable deflection element on the opposite side of the cables. The counter deflection element here can also be a section of the area of the ultrasound welding device which holds the sonotrode or the anvil, depending on which tool is present in the respective area. On the side facing away from the compression space, a second counter deflection element is arranged, in particular relative to the cables on the same side as the first counter deflection element.

Moreover, on the side of the adjustable deflection element facing away from the compression space, in particular relative to the cables on the same side as the latter, an additional deflection element forming a counter bearing is provided, in order to align the cables at the time of the action of the adjustable deflection element on the cables, in such a manner that a course that is approximately in the extension of the longitudinal axis of the compression space is made possible. The counter bearing should have a larger spacing from the adjustable deflection element than the second counter deflection element.

The horizontal and the vertical adjustment of the adjustable deflection element can also occur simultaneously, i.e., during the lowering, the deflection element at the same time moves forward over the cables, and during the lifting, the deflection element is retracted at the same time from the area of the cables.

After the welding process has been completed and the adjustable deflection element has been moved back, a pressure element can act on the cables deformed by the pressure element, element which is adjustable along a plane which corresponds to the vertical adjustment plane of the pressure element. In the process, the pressure element acts on the cable from the side that is opposite the adjustable pressure element.

Moreover, it is provided that the deflection device, which can also be referred to as damping device, is monitored by a sensor system, such as stroke or force measurement device or light barrier, in order to apply the determined values to a higher level control, so that the damping device can be monitored and documented as a result.

Based on the teaching of the invention, the oscillation amplitude of the cable or cables is damped in the area of the component in comparison to the amplitude of the sonotrode by at least 50%, preferably by up to 95%, and particularly by between 70% and 95%.

An arrangement for ultrasound welding of electrical conductors to form an end node or transit node of the type mentioned at the start is characterized substantially in that the deflection device comprises at least two mutually adjustable deflection elements which form, in the area of the extension of the longitudinal axis of the compression space, a guide for the at least one cable, by means of which a change in course can be forced onto the cable in the area of the guide.

Here, according to an embodiment, it is provided that at least one deflection element, preferably each deflection element, can have a cylindrical or conical geometry. Furthermore, at least one deflection element can be profiled on its top side or it can optionally also be mounted rotatably, in order to permit a reliable gripping and deflection of the cable, without the latter having to be stretched if necessary. A corresponding design can also be used for several or all the deflection elements.

In particular, if the pressure elements have a conical geometry, then their apexes should point in the direction of the surface of the workplace along which the cables are led. This is advantageous, since cables of different cross sections can be welded to each other, wherein usually the cables having the largest cross section are arranged first on the bottom surface of the compression space. This simplifies the stacking.

In the corresponding embodiments, the deflection elements originate from a horizontally or substantially horizontally extending work plane along which the cables run. Thus, a relative adjustment of the pressure elements toward each other occurs in the work plane, that is, substantially horizontally.

Alternatively and to achieve a compact construction, the possibility exists that the at least one adjustable pressure element is adjusted both perpendicularly toward the cables and also vertically. If a pneumatic cylinder is used as a drive, for example, then the piston connected to the pressure element is adjusted vertically. Consequently, only little space is required for the deflection device, since the cylinder can be attached to the head, that is to the front side of the ultrasound welding device.

In order not to impede the insertion of the cables in the compression space as a result of the adjustable pressure element extending above the cables, said pressure element can be retracted for the insertion out of the insertion path of the cables. In the process, a mechanism can be used, as also known for use in an ultrasound welding device relative to their anvils with a support and a cross head which can be adjusted perpendicularly to said support.

The possibility also exists to use the pressure pieces as deflection elements which can be profiled on the cable side in such a manner that, when the pressure pieces are pushed together, the cable located between the said pressure pieces undergoes the desired change in course. In particular, it is provided here that a pressure piece is arranged stationarily, that is it forms nearly a counter bearing to the adjustable pressure piece. The geometries of the surfaces extending on the cable side are therefore configured so they are complementary to each other.

Moreover, a pressure element can be designed as a bellows cylinder which is adjustable toward a counter bearing, whose cable-side surface ensures the desired change in the course of the cable or cables.

The possibility also exists to design the pressure mold parts used as a single piece or a multiple piece.

Furthermore, the pressure mold parts can be designed to be resilient on the cable side.

It is also not absolutely required to associate a counter bearing in the form of a pressure mold part with the adjustable pressure mold part. Pins or rollers can also be associated with a pressure mold part in such a manner that the change in course is ensured.

If the pressure elements arranged on a side of the guide, and extending oppositely to the adjustable pressure element, are stationarily arranged, then the possibility also exists of adjusting or moving in order to introduce the cables without problem into the guide.

When using cylindrical pressure elements, that is pins as it were, the latter can be arranged moreover so they can be tilted with respect to the vertical, in order to facilitate the insertion of the cables.

In the case of pressure elements designed in the shape of a pin or a cylinder or a cone, an arrangement should occur in such a manner that at least two pressure elements extend on one side of the guide and, between said elements on the opposite side of the guide, at least one pressure element extends.

However, the possibility also exists for the adjustable pressure element to be designed in the shape of a fork, and to comprise two pin-shaped elements extending transversely with respect to the cables to be inserted, in which the pin-shaped elements the cable or cables is or are inserted, so that, by adjustment toward the additional pressure elements arranged before or after the fork-shaped adjustable pressure element, said pressure elements function as a counter bearing, if the fork-shaped pressure element is adjusted in the direction of an imaginary straight line connecting the additional pressure elements. The fork-shaped design offers the advantage that, when retracting the corresponding pressure element, the cables are bent back, so that they continue to extend over their entire length along the straight line.

Since, as mentioned in the preparation of transit nodes, components can comprise cables on the two sides of the compression space, corresponding deflection devices can be provided before and after the compression space.

In order to prevent a deflection of the cables in their free end sections, during the forced change in the course, it is preferable to arrange additionally a guide element on the side of the deflection device that is remote from the compression space, in particular on the side relative to the extension of the longitudinal axis of the compression space, on which side the adjustable deflection element is located.

Additional details, advantages and characteristics of the invention result not only from the claims, the characteristics to be taken from them—separately and/or in combination—, but also from the subsequent description of preferred embodiment examples.

Figure 2:
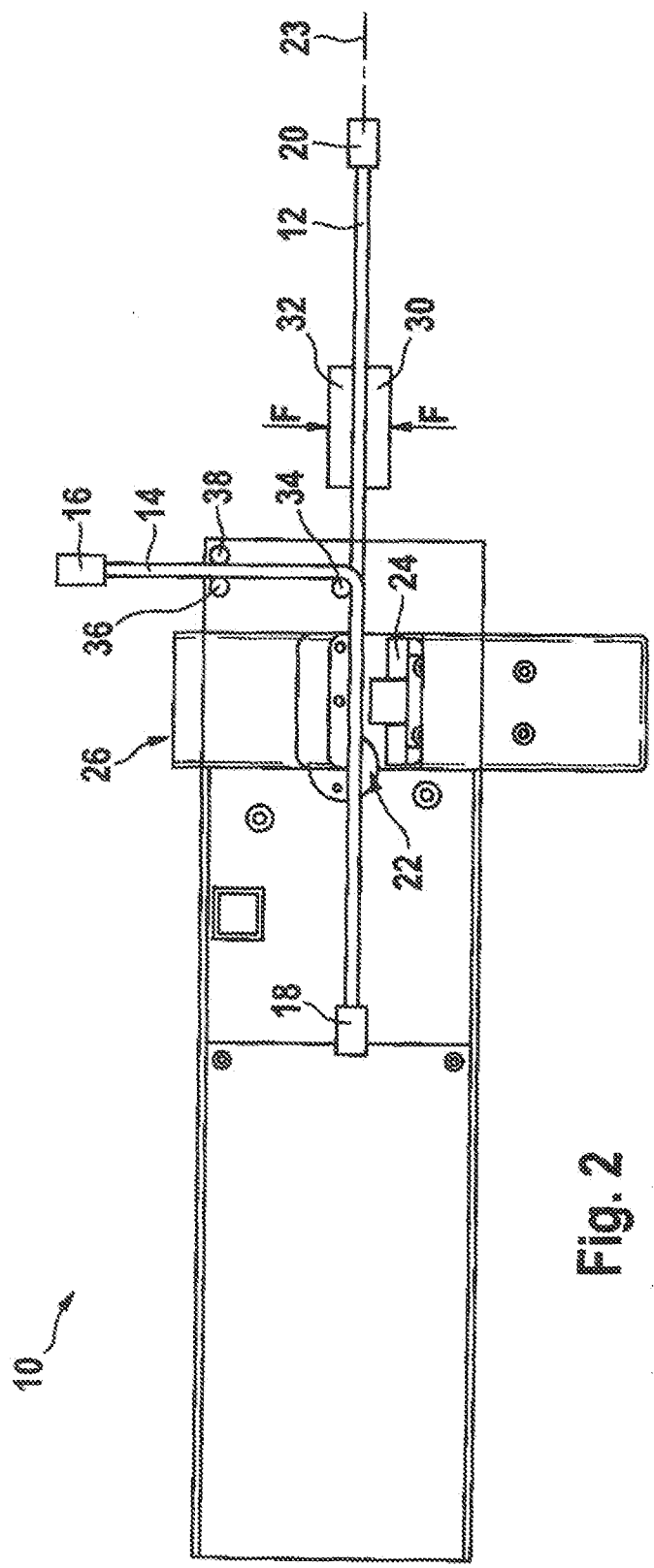
Figure 3:
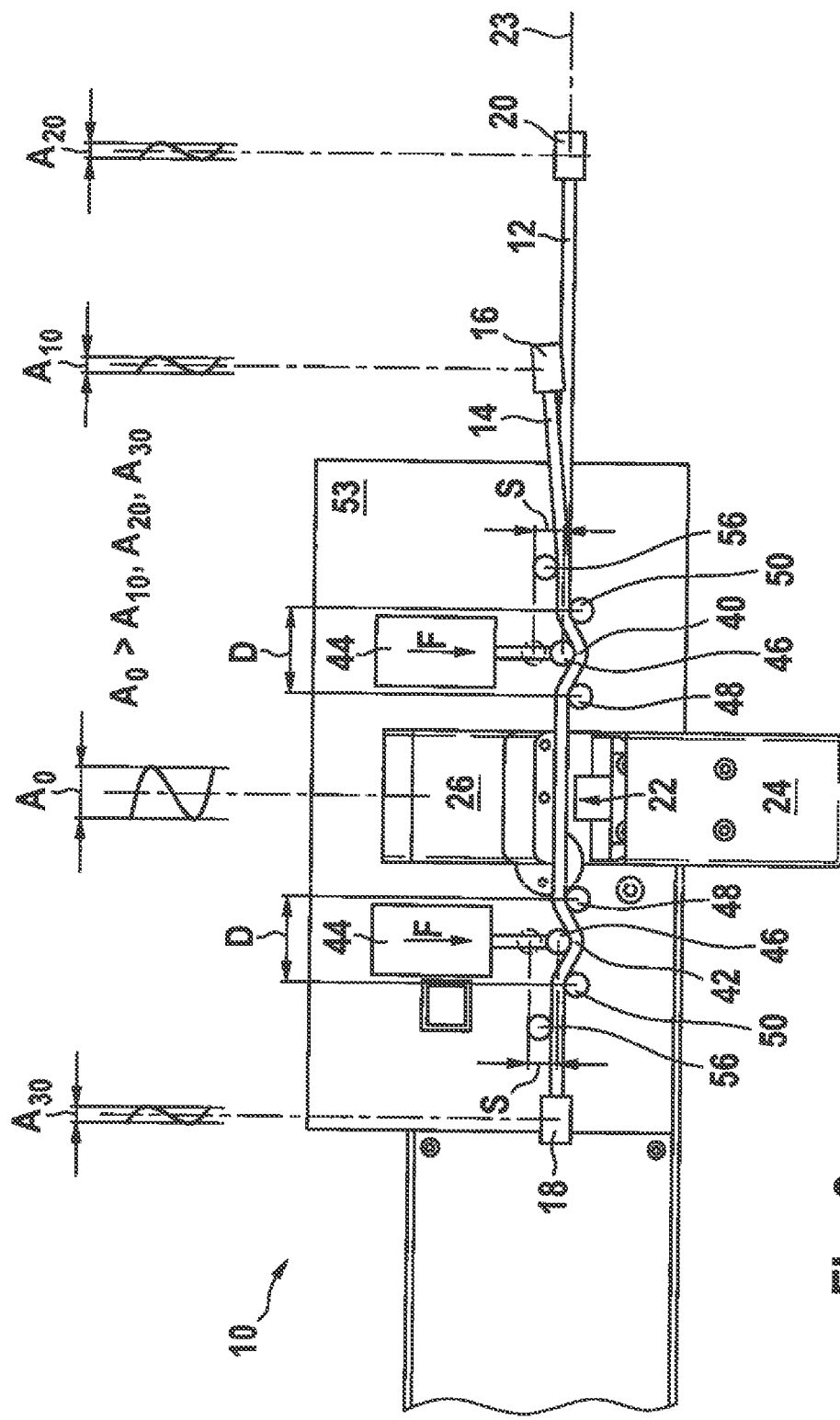
Figure 4:
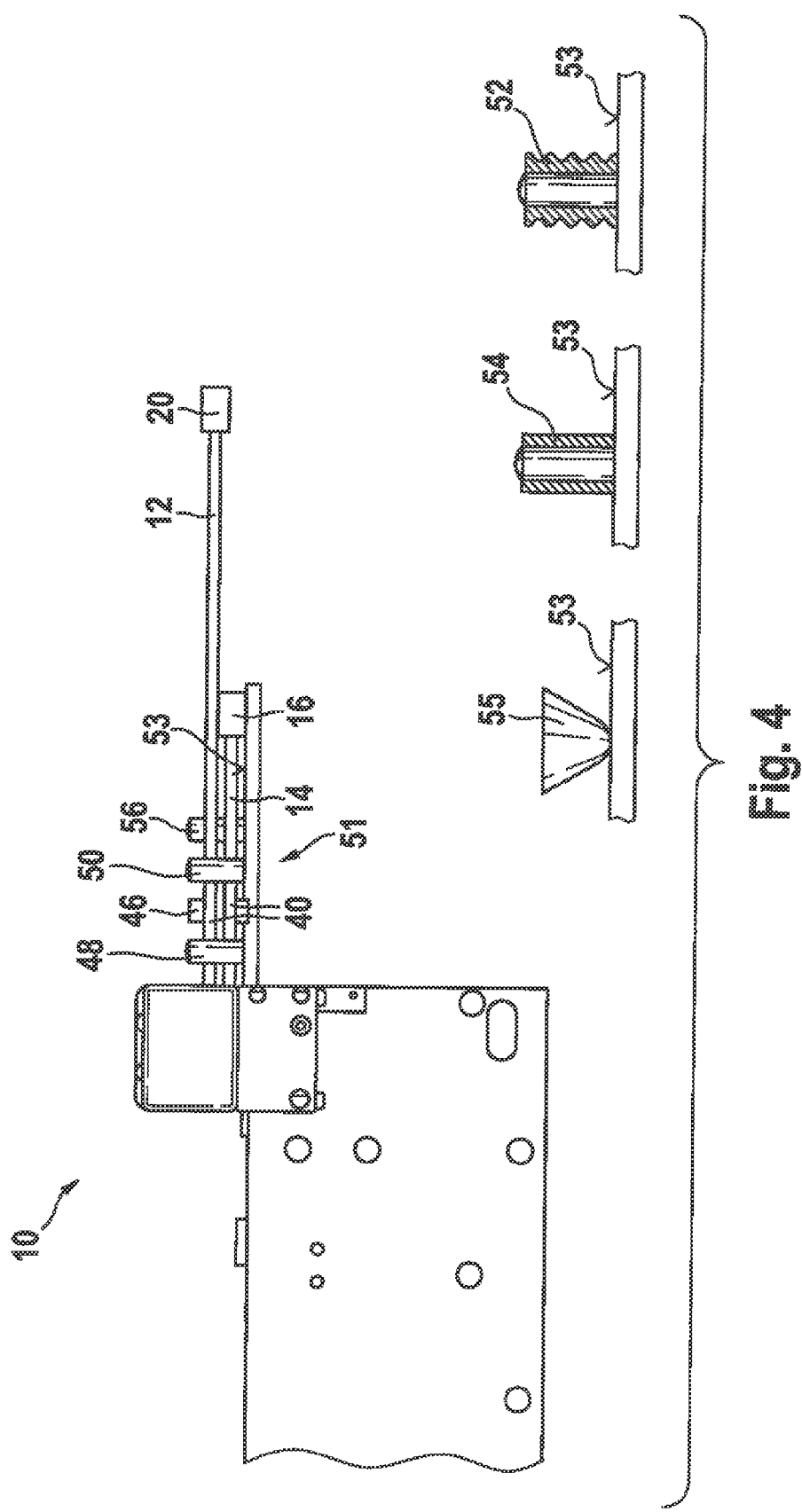
Figure 5:
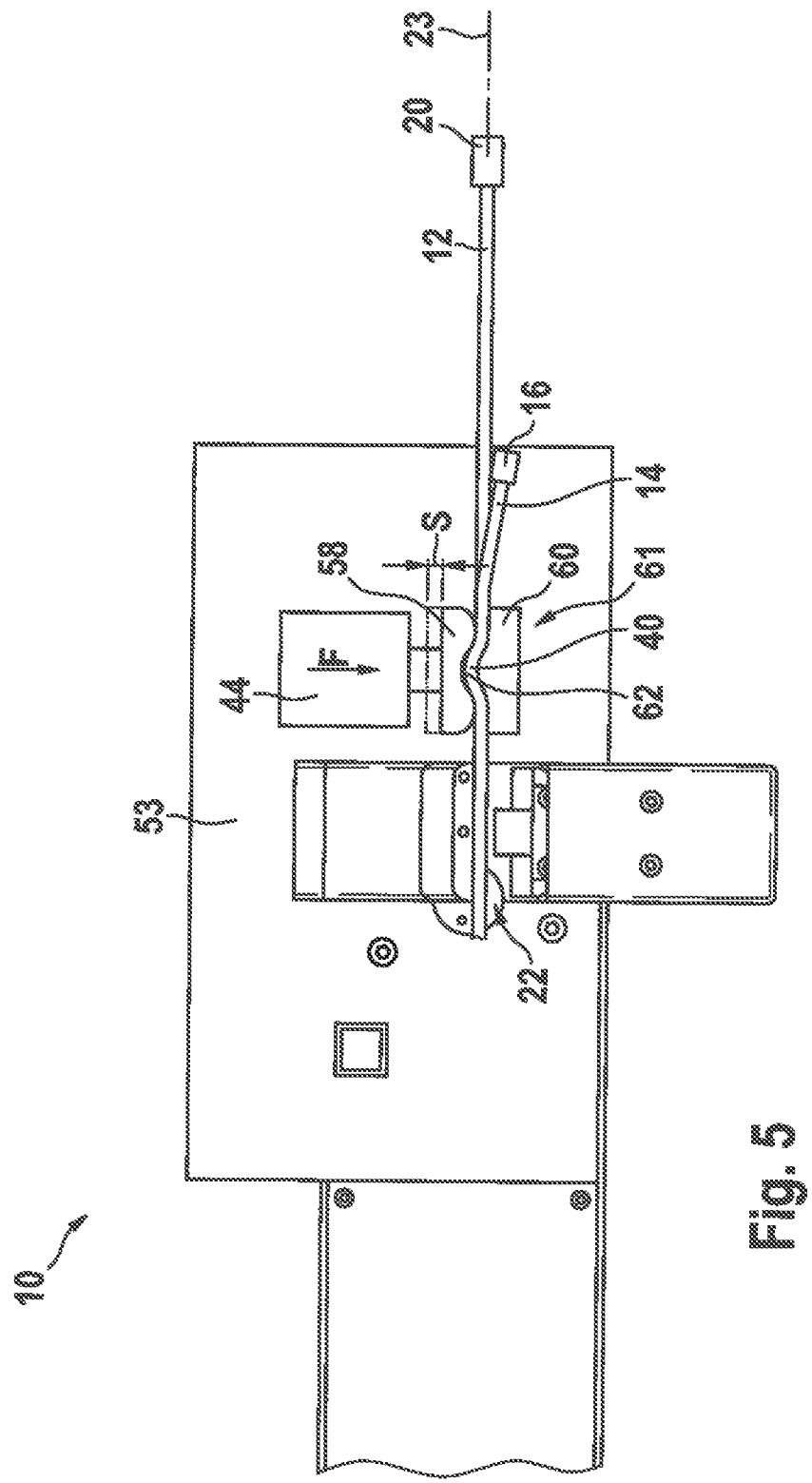
Figure 6:
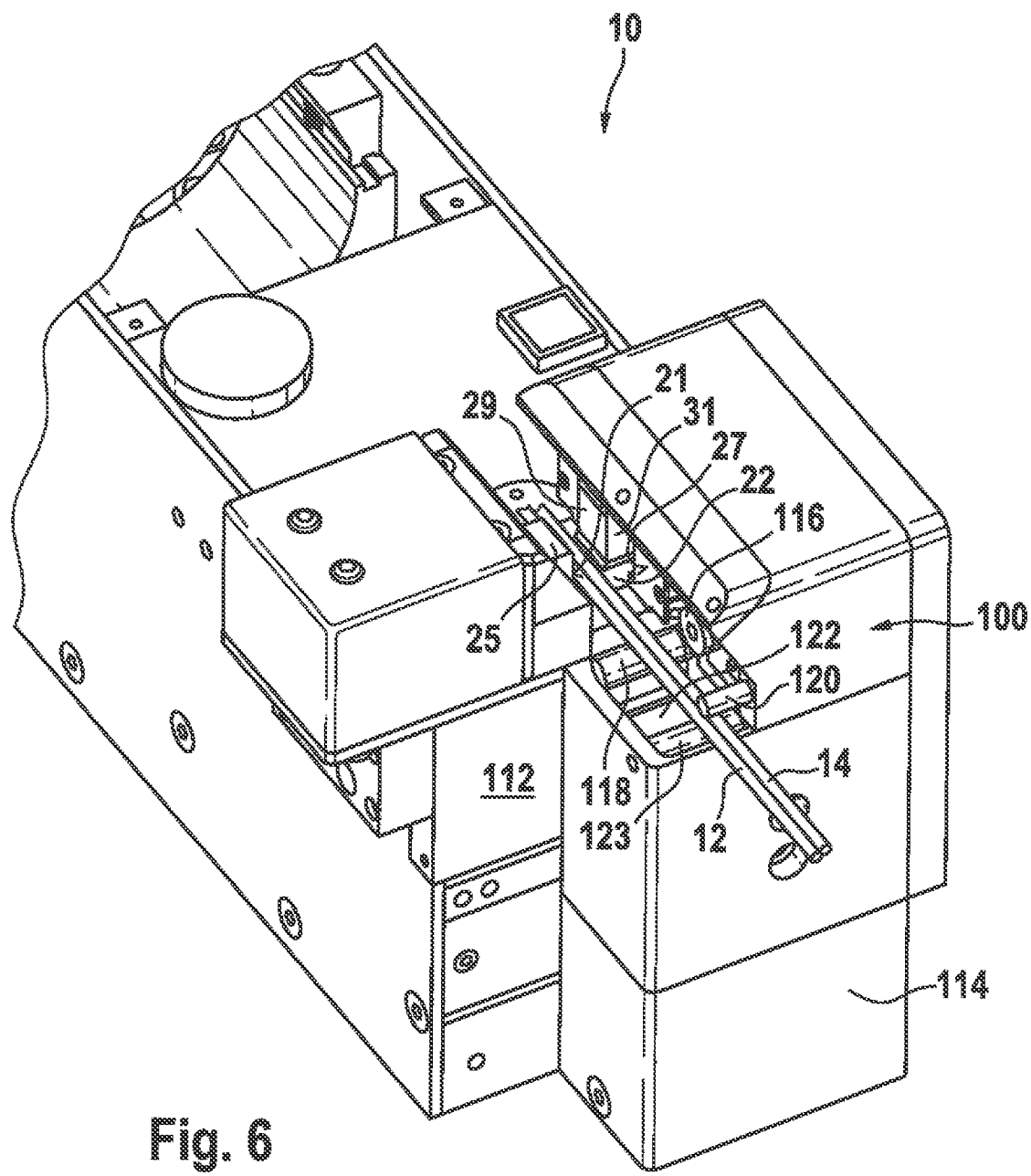
Figure 7:
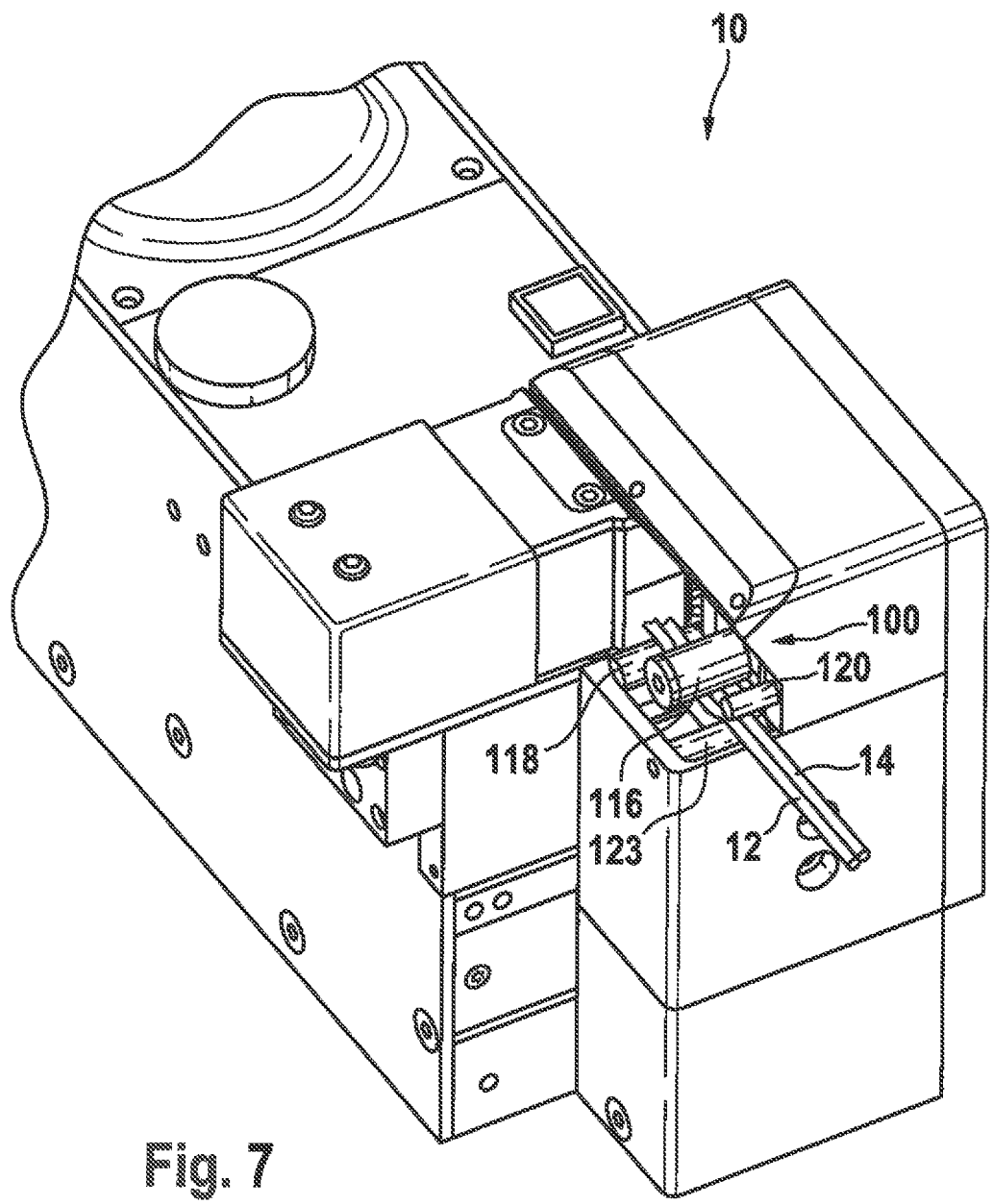
Figure 8:
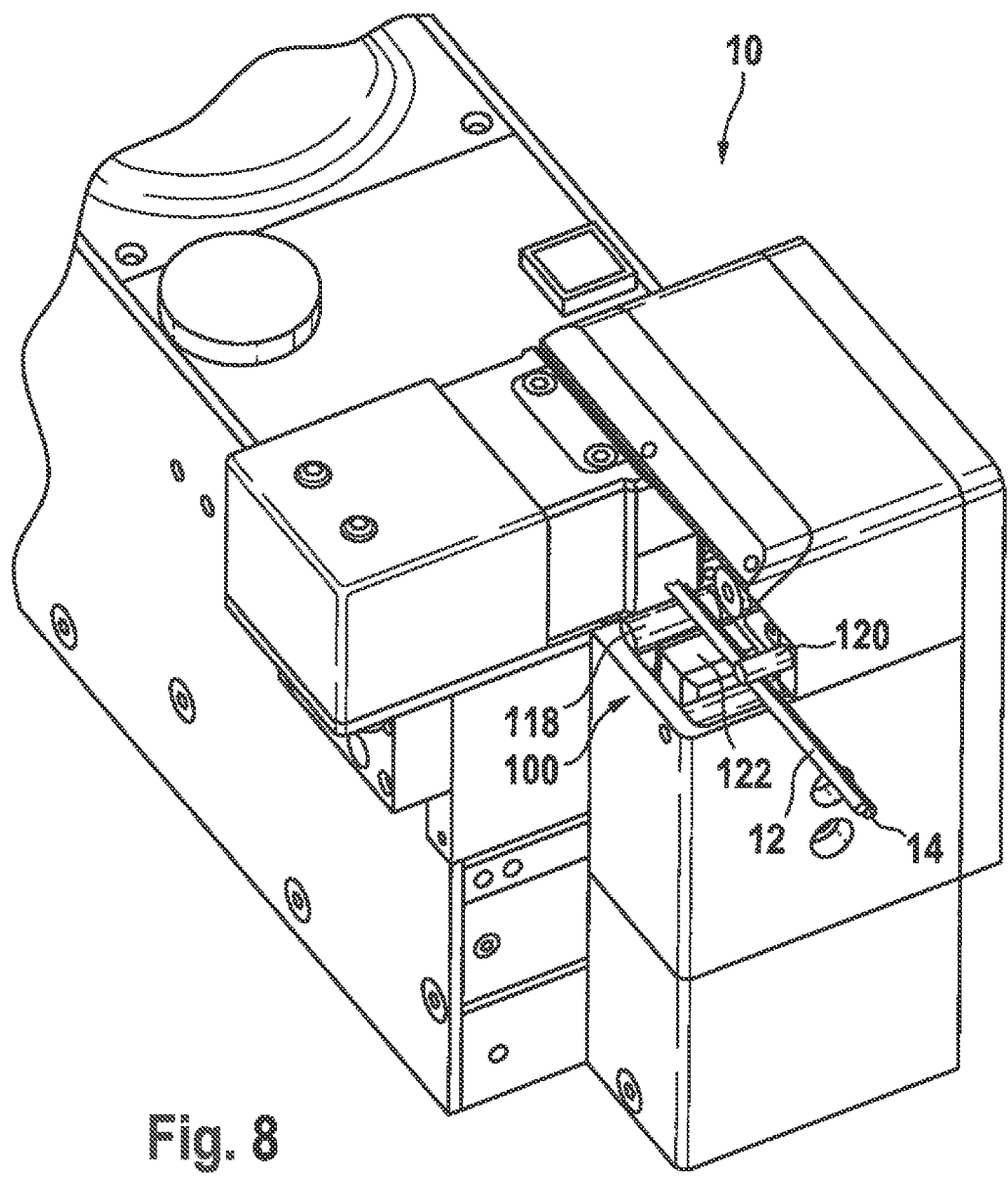

FIG. 1 shows a basic representation of an ultrasound welding device according to the prior art, FIG. 2 shows the ultrasound welding device according to FIG. 1 with a damping device according to the prior art, FIG. 3 shows a basic representation of an arrangement with a first embodiment of a damping device according to the invention, FIG. 4 shows the arrangement according to FIG. 3 in a side view, FIG. 5 shows an arrangement with a second embodiment of a damping device according to the invention, FIG. 6 shows an arrangement of a third embodiment of a damping device according to the invention at the time of the insertion of the cables, FIG. 7 shows the arrangement according to FIG. 6 with an adjustable pressure element acting on the cables, and FIG. 8 shows the arrangement according to FIGS. 6 and 7 after the welding and the bending back of the cables have taken place.

In the figures, in which identical elements are provided in principle with identical reference numerals, an ultrasound welding device 10 is represented, by means of which the electrical cables 12, 14 are welded to form a transit node (FIGS. 3, 4) or an end node (FIGS. 5-8). The cables 12, 14 are cables made from a plurality of strands or fine cores, which have an insulation outside of the node to be produced. Corresponding cables are used, for example, in the automobile industry for an on-board network. Here, the cables 12, 14 to be welded to form end or transit nodes—very generally welding nodes—often have at their free ends components, such as, in particular, contact parts, such as plug contacts, plug connectors, jack or socket parts, which can have a filigree design. The possibility also exists that each end of a cable 12, 14 comprises a corresponding component, as illustrated in FIG. 2. Thus, the cable 14 comprises the components 16, 18. The line 12 is provided with a component 20 in the form of a plug connector.

The ultrasound welding device 10 has a conventional design, i.e., a generator is connected to a converter by means of which the ultrasound oscillations—optionally amplified by a booster—are transmitted to the sonotrode. The sonotrode delimits the bottom side of an adjustment space 22 which is preferably adjustable in terms of height and width, and delimited to the side by a slider 24 and on the opposite side by a multipiece anvil 26. The anvil 26 consists of a column which contains an upper end of the compression space 22 delimiting cross head, and which extends oppositely to the slider 24 and thus delimits the compression space 22 to the side. With regard to the design of a corresponding ultrasound welding device and the compression space, reference is made to the prior art, particularly to DE.Z.: Bibliothek der Technik [Technology Library], Volume 108, Ultraschallschweißvorrichtung [Ultrasound welding], verlag modern industrie, 86895 Landsberg, 1995, particularly page 20 ff., or EP-B-0 723 713, to the disclosures of which explicit reference is made, and which are the subject matter of the present description.

In the case of an opened compression space 22, that is in FIGS. 1, 3 with the cross head shifted toward the upper margin and the slider 24 adjusted toward the lower margin, the cables 12, 14 are inserted into the compression space 22. The corresponding stripped sections of the cables 12, 14, which are located inside the compression space 22, and also referred to as the first sections, extend, in the case of a closed compression space 22, along its longitudinal axis 23.

Usually, for producing transit nodes, separate cables are introduced from the two sides of the compression space 22. The continuous line 14 in that regard represents a special case.

If, by means of the sonotrode, ultrasound is applied to the first sections, then the oscillations are transmitted to the cables 12, 14, with the consequence that the components 16, 18, 20 are set in oscillation to an extent such that they can be destroyed.

The amplitudes $A_0$, $A_1$, $A_2$, $A_3$ of the oscillations are included in the drawing in FIG. 1 in a very general manner in association with the individual sections and they illustrate that the amplitudes in the area of the components 16, 18, 20 are hardly damped at all in comparison to those in the compression space 22. $A_0$ is the amplitude of the sonotrode and the amplitudes $A_1, A_2, A_3$ are those in the area of the components 16, 20, 18.

In order to dampen the amplitudes, the measures that can be seen in FIG. 2 have already been taken in the prior art.

Thus, the possibility exists of either bending the cable 14 by 90° or of clamping the cable 12 between the damping jaws 30, 32 which comprise parallel delimitation faces on the cable-side.

In practice, it has been found that an effective damping is not possible using the damping jaws 30, 32. The damping occurs more effectively by deflecting the cable 14 by 90° (FIG. 2).

The deflection by 90° occurs over a guide pin 34. Moreover, two guide pins 36, 38 forming a slit are provided, in which, in the embodiment example, the cable 14 with its end area has to be inserted, in order to ensure the 90° bending.

However, disadvantages result in regard to the handling, because often not enough space is available to be able to bend cables, which can be very long, by 90°. Here, one must also take into consideration that cables extend to the two sides of the compression space and can comprise components to be protected, on the two sides.

In order to avoid the disadvantages that are inherent in the prior art, the cables 12, 14, according to the invention, are influenced only in sections in terms of their course before and after the compression space 22, so that the cables 12, 14 basically continue to extend along the extension of the longitudinal axis 23 of the compression space 22, that is along the straight line which is predetermined by the first sections of the cables 12, 14, which extend within the compression space 22.

As is apparent from FIGS. 3-5, the cables 12, 14 are deflected in each case in a second section 40 or 42 via deflection elements to be explained as an example below, in such a manner that the result is an approximately arc-shaped course in the second sections 40, 42. This course is sufficient to dampen the cables 12, 14 to an extent such that the oscillations occurring in the ends, that is in the components 16, 18, 20, have a considerably reduced amplitude $A_{10}$ or $A_{20}$ or $A_{30}$, in comparison to the starting amplitude $A_0$ in the compression space 22, as can be seen in principle in FIG. 3. The amplitude is damped by the arc- or curve-shaped change in the course, to an extent such that a destruction of the components 16, 18, 20 is prevented. In comparison to the amplitude of the sonotrode, the damping is at least 50%, and particularly up to 95%, in the area of the components 16, 18, 20.

As can be seen in FIG. 3, a change in the course of the cable 14 both before and also after the compression space 22 occurs, since the cable 14 extends on the two sides of the compression space 22 and it comprises a component on the respective end, namely the components 16 and 18. Here, the deflection devices that produce the changes in the course can be designed identically before and after the compression space 22. Instead of the one cable 14, a separate cable can be led from each side of the compression space 22.

In the embodiment example of FIG. 3, a pin or cylinder element is provided which is adjustable by means of a, for example, pneumatic or electric drive 44, and which acts as a pressure piece 46, and extends toward one side of the cables 12, 14, that is the imaginary extension of the longitudinal axis 23 of the compression space 22. Oppositely, in the embodiment example, and in the longitudinal direction of the cable 12, 14 before and after the pressure piece 46, a counter element 48, 50 designed also in the shape of a pin or a cylinder is provided, whose spacing D is preferably between 10 mm and 50 mm. The pressure piece 46 and the counter elements 48, 50 delimit a guide for the cables 12, 14, through which the extension of the longitudinal axis 23 passes.

The driven pressure piece should be adjusted by a distance S such that the deflection of the cables 12, 14 is in the range between 3 mm and 20 mm.

If the cables 12, 14, in the case where the pressure piece 46 is retracted, are placed between the pressure piece 46 and the counter pieces 48, 50, that is to say positioned in the guide, and if subsequently the pressure piece 46 is adjusted in the direction of the counter pieces 48, 50, then an arc- or curve-shaped course is forced on the second sections 40 of the cables 12, 14. The situation is similar for the second section 42 before the compression space 22. An arc- or curve-shaped geometry can be achieved as a function of the design and arrangement of pressure pieces and counter pieces.

To prevent, on the one hand, a deflection of the cables 12, 14, particularly a migration of said cables upward along the pressure piece 46 or the counter piece 48, 50—which can also be referred to as counter bearings—, they can be profiled as illustrated in the representation of a corresponding cylindrical element 52 in FIG. 4, which can be used as a pressure piece 46 or a counter piece 48, 50. Additionally or alternatively, the possibility exists of designing the pressure piece 46 or the counter pieces 48, 50 so they can be rotated (element 54 in FIG. 4). As a result, a reliable guidance of the cables 12, 14 is ensured.

The pressure piece 46 and the counter elements 48, 50—also referred to as counter pieces—which originate in the embodiment example of FIGS. 3-5 from a horizontally extending work surface 53, consequently form a deflection device 51, wherein the pressure piece 46 extends preferably in the middle between the counter pieces 48, 50.

In the case of a horizontally extending work surface, which can be seen in FIGS. 3-5, and in the case of deflection elements originating from them, the following embodiments are also possible. The pressure piece 46 and the counter pieces 48, 50 can have a conical shape, wherein the apex points downward, as illustrated by the representation in FIG. 4 (element 55).

The possibility also exists of arranging the pin-shaped or cylindrical elements, that is to say the pressure piece 46 and the counter pieces 48, 50 so that they can be tipped toward the vertical, in order to facilitate the insertion of the cables 12, 14.

In order to prevent the cables 12, 14 from being deflected toward the upper margin of the drawing in the graphic representation of FIG. 3, at the time of the adjustment of the counter piece 46 in the direction of a straight line connecting the counter pieces 48, 50, a guide pin 56 can be provided on the side of the deflection device 51 facing away from the compression space 22, in particular on the side of the cables 12, 14 on which the pressure piece 46 acts on the cables 12, 14. Thus, it is ensured that at the time of conferring the change in course to the cables 12, 14, the latter are not deflected on the end side, which has the consequence that they continue to extend along the extension of the longitudinal axis 23 of the compression space 22.

The arrangement of the pressure piece 46, the counter pieces 48, 50 and the guide pin 56 which preferably has a design that allows it to rotate, and the mutual association, can also be seen in the side representation of the arrangement according to FIG. 4, in which, in contrast to the representation in FIG. 3, the left deflection device has been omitted.

The pressure piece 46 which is adjustable transversely with respect to the extension of the longitudinal axis 23 can also be in the shape of a fork, i.e., it can comprise two pin-shaped or cylindrical elements between which the cables 12, 14 can be inserted. The two pin-shaped or cylindrical elements here span a straight line which extends transversely with respect to the cables 12, 14. In order to change the cables 12, 14 in terms of their course, in particular in their respective second section 40, to the desired extent, the pressure piece designed in the shape of a fork is then adjusted toward the counter pieces 48, 50 present in FIGS. 3 and 4.

The fork-shaped embodiment ensures, during the retraction, that the bent cables 12, 14 are deformed back again or again approximately to their original shape (straight course).

An additional embodiment of a deflection device 61 can be seen in FIG. 5. Thus, the respective second section 40 of the cables 12, 14 is guided between a pressure mold piece 58 and a counter piece or counter bearing 60, which, on the cable side, have a geometric course that ensures the desired change in the course of the second sections 40. In the embodiment example, the pressure mold piece 58 is connected to the drive 44. A corresponding deflection device can also be provided on the left side of the compression space 22 in the representation.

The pressure mold part 58 can be designed as a single piece or multipiece part. On the cable side, said pressure mold part can be profiled. The surface can also be made from a resilient material. The pressure mold piece 58 with the drive 44 can also be replaced by a bellows cylinder which adapts on the front side to the geometric course of the counter bearing 60.

Instead of the represented counter bearing 60, a pin or a roller can also be provided, which is positioned in such a manner toward the pressure mold part 58, that the cables 12, 14 are bent in the direction of a recess 62 of the pressure mold part 58, when the pressure mold part 58 is adjusted in the direction of the pin or roller which is not shown.

From the basic representation of FIG. 5 one can see that the mutually facing surfaces of the pressure mold part 58 and of the counter piece 60 have a mutually complementary design at least to the extent that the desired changes in course are to be conferred to the second sections 40 of the cables 12, 14.

While in FIGS. 3-5 a very basic representation is made of an arrangement in which the deflection elements are adjustable with respect to each other in a plane which extends horizontally, and which is thus predetermined by the work surface 53, according to the embodiment example of FIGS. 6-8, the possibility exists of carrying out an adjustment both perpendicularly to the cables 12, 14 and also in the vertical direction. This results in a compact structural unit, since the drive, such as a pneumatic cylinder, can be attached on the front side 112 of the ultrasound welding device 10. This is shown very basically in FIGS. 6-8, wherein the drive, such as a pneumatic cylinder, is arranged in a housing 114 and is thus not visible.

In FIG. 6, the compression space 22 is open, delimited by a face 21 of a sonotrode, a perpendicularly extending delimitation face of a side slider 25, an opposite side face 27 of a two-part anvil 29 with cross head 31. In the case of a closed compression space 22, the cross head 31 closes the compression space opposite the face 21 of the sonotrode.

Consequently, a construction is found that can be taken from EP-B-0 723 713, so that reference is made to its disclosure.

In FIG. 6, the deflection device 100, by means of which the cables 12, 14 are damped during the welding, is represented in the position in which the insertion of the cables 12, 14 into the compression space 22 occurs. For this purpose, a first deflection element 116, which preferably has a cylindrical shape, is located in a retracted position, in order to facilitate the insertion of the cables 12, 14 into the compression space 22. From the representation in the drawing one can see that, with regard to the compression space 22, between the latter and the deflection element 116 connected to the piston of the cylinder, an additional (second) deflection element 118 is arranged, which also preferably has a cylindrical shape or comprises a portion of such a shape, whose axis extends parallel to the deflection element 116. In the area of the adjustable deflecting element 116, which is remote from the compression space, a third deflection element 123 is present, which is arranged on the side relative to the cables 12, 14, like the second deflection element 118. The third deflection element 123 can here also have a cylindrical shape; however, like the second deflection element 118, it is preferably a section, such as a radius, of the housing 114. Finally, a fourth deflection element 120, to be referred to as counter bearing, having preferably a cylindrical or pin-shaped geometry, is provided, which extends on the side on which the adjustable deflection element 116 is arranged. Furthermore, one can see in the figures that, beneath the adjustable deflection element 116, an additional element, to be referred to as pressure piece 122, is arranged in the housing 114, an element which is adjustable in a plane in which the deflection element 116 is adjusted, that is vertically in the representation. The pressure element 122 has the purpose of bending the cables 12, 14 back approximately to the shape of their original course.

As mentioned, in FIG. 6, the position of the ultrasound welding device 10 is reproduced, in which the cables 12, 14 are inserted in the compression space 22. In FIG. 7, a very basic representation of the position is provided, in which the cables 12, 14 are welded in the compression space 22 and in the process damped by lowering the deflection element 116 in the direction of the cables 12, 14. As a result, the cables 12, 14 are deformed, since they extend between the second deflection element 118 which is remote from the compression space, the lowered first deflection element 116, and the third deflection element 123 which is remote from the compression space. In order to prevent an undesired deflection of the free ends of the cables 12, 14, the fourth deflection element 120 or counter bearing, which is remote from the compression space, is provided, against which the free sections of the cables 12, 14 can be applied during the forced change in course. For this purpose, it is provided that the counter bearing or fourth deflection element 123 is designed so that it can be rotated, exactly like the counter bearing 56 in FIGS. 3 and 4. As a result of the capacity to rotate, a friction-free adjustment of the cables 12, 14 toward the deflection element 123 occurs, when said cables are deformed by adjusting the deflection element 116 for the purpose damping the cables 12, 14 or at the time of bending back.

After the cables 12, 14 have been welded, they remain with their insulated ends 13, 15 which have been welded to a node fixed in the compression space 22. The adjustable first deflection element 116 is lifted from the cables 12, 14 and moved back, as illustrated in a comparison of FIGS. 7 and 8. Then, the pressure piece 122 is adjusted in the direction of the cables 12, 14 that is vertically, so that the cables 12, 14 which previously were deformed in the direction of the pressure piece 122 can be bent back.

In order to adjust the pressure element 116 both in the horizontal and also in the vertical direction, a construction can be chosen, as used in connection with the multipiece anvil, i.e., the movements are superposed. In that regard, reference is made to the corresponding constructions.

The possibility also exists of providing a deflection device 100 on the two sides of the compression space 22.

LIST OF REFERENCE NUMERALS

| | |
|---|---|
| 10 | Ultrasound welding device |
| 12, 14 | Cables |
| 16, 18 | Ends |
| 20 | Component |
| 21 | Face |
| 22 | Compression space |
| 23 | Longitudinal axis |
| 24 | Rail |
| 25 | Side rail |
| 26 | Anvil |
| 27 | Side face |
| 29 | Anvil |
| 30, 32 | Damping jaw |
| 31 | Cross head |
| 34 | Guide pins |
| 36, 38 | Guide pins |
| 40, 42 | Second section |
| 44 | Drive |
| 46 | Pressure part |
| 48, 50 | Counter element |
| 51 | Deflection device |
| 52 | Cylindrical element |
| 53 | Work face |
| 54 | Element |
| 55 | Element |
| 56 | Guide pin |

| | |
|---|---|
| 58 | Pressure mold part |
| 60 | Counter axle |
| 61 | Deflection device |
| 62 | Recess |
| 100 | Deflection device |
| 112 | Front side |
| 114 | Housing |
| 116 | Deflection element |
| 118 | Deflection element |
| 120 | Deflection element |
| 122 | Pressure piece |
| 123 | Deflection element |

The invention claimed is:

1. A method for welding insulated cables made from metal strands or cores to form an end node or transit node, the method comprising:
stripping insulation from a first section of each cable, introducing the stripped first section of each cable into a compression space of an ultrasound welding device, said compression space, having a longitudinal axis, is adjustable in terms of height and width, and in which each first section extends along a straight line running in a direction of the longitudinal axis, wherein at least one cable comprises, spaced from the end node or transit node to be welded, a component, and at least the cable comprising the component, between the compression space and the component in a second section, is inserted between at least one pressure piece and one counter piece of a damping device, wherein during the insertion, the at least one pressure piece and said one counter piece are spaced to each other in such a way, that the second section runs along the straight line,
closing the compression space and adjusting the at least one pressure piece and/or the at least one counter piece in such a way, that an arc- or curve shaped course is forced on the second section in region of the damping device without an essential deflection of an end section of the cable comprising the component, and welding the first sections to form the end node or transit node.

2. The method according to claim 1, wherein,
the second section undergoes an arc- or S- or Z-shaped or meandering change in course.

3. The method according to claim 1, wherein,
the second section is guided between several deflection elements, of which at least two deflection elements are adjusted relatively toward each other to force the change in course transversely to the longitudinal direction of the cables.

4. The method according to claim 1, wherein,
the cables are held by a fork-shaped first pressure element which is adjusted to achieve the change in course toward at least one second pressure element, and in that, during a resetting of the first pressure element, the cables are bent back to reverse the change in course.

5. The method according to claim 1, wherein,
at least two deflection elements are adjusted relative to each other in a horizontally or vertically extending plane.

6. The method according to claim 1, wherein, if the change in the course is forced by a vertically adjustable deflection element, said deflection element is adjusted horizontally for the insertion of the cables into the compression space.

7. The method according to claim 1, wherein all additional cables extending along the cable comprising the component are run through, between the deflection device.

8. An ultrasound welding arrangement for ultrasound welding of cables made from metal strands or cores, comprising:
a compression space adjustable in terms of height and width for receiving a first section of each cable, along whose longitudinal axis each first section can be aligned, as well as a damping device which holds at least one of the cables, and which is arranged with spacing from the compression space in an extension of the longitudinal axis of the compression space, wherein,
the damping device comprises at least two deflection elements which can be adjusted relative to each other, and which form, in an area of the extension of the longitudinal axis of the compression space, a guide for at least one of said cables, by means of which an arc- or curve-shaped course is forced onto the at least one cable in an area of the guide when the cables are welded; and
wherein the at least two deflection elements are adjustable in such a way, that when inserting the at least one cable between said deflection elements, the at least one cable runs in a direction of the longitudinal axis.

9. The arrangement according to claim 8, wherein,
at least one deflection element has a cylindrical or conical geometry and/or is rotatably mounted and/or is a single piece or multipiece pressure mold part and/or, in an area of the guide on the guide side, is profiled and/or configured so as to be resilient and/or is a bellows cylinder.

10. The arrangement according to claim 8, wherein,
the deflection device comprises deflection elements extending on both sides of the guide, in that a first deflection element is arranged on one side of the guide, and can be adjusted transversely to the extension of the longitudinal axis of the compression space and relative to at least two second deflection elements arranged on another side of the guide, wherein, viewed along the extension of the longitudinal axis, the first deflection element is arranged between the two second deflection elements.

11. The arrangement according to claim 8, wherein,
at least one deflection element is connected to a drive for adjustment toward at least one additional deflection element or pair of deflection elements.

12. The arrangement according to claim 8, wherein,
the guide is delimited on one side by a first pressure mold part, wherein the first pressure mold part has an arc-shaped geometry on a surface facing the guide, and on an opposite side by a counter bearing which is associated with the pressure mold part, and whose surface facing the pressure mold part has, at least in sections, a geometric course complementary to the surface geometry of the pressure mold part.

13. The arrangement according to claim 8, wherein,
on a side of the guide which is turned away from the compression space, a stationary guide element is arranged in the area of the extension of the longitudinal axis of the compression space on a side of cables to be welded, on which the at least two adjustable deflection elements are located.

14. The arrangement according to claim 8, wherein,
one deflection element has a fork shape such that two pin-shaped or cylindrical elements form a holding fixture for the at least one cable and in that the fork-shaped deflection element is adjustable toward two additional deflection elements, wherein an additional deflection element extends toward one side of the fork-shaped deflection element.

15. The arrangement according to claim 8, wherein,
the adjustable deflection element is connected to a drive to enable a horizontal or vertical adjustment of the element.

16. The method according to claim 3, wherein said several deflection elements are cylindrical or conical elements, or mold parts.

17. The arrangement according to claim 8, wherein the deflection device holds all of the cables.

18. The arrangement according to claim 10, wherein the deflection device comprises cylindrical or pin-shaped deflection elements.

19. The arrangement according to claim 10, wherein first deflection element is cylindrical or pin-shaped.

20. The arrangement according to claim 10, wherein the first deflection element is adjusted perpendicularly to the extension of the longitudinal axis of the compression space.

21. The arrangement according to claim 11, wherein the drive is an electrical or pneumatic drive.

22. The arrangement according to claim 13, wherein the guide element is rotatable.

23. The method according to claim 1, wherein a free end of the at least one cable is freely moveable during welding.

\* \* \* \* \*